United States Patent [19]

Mori et al.

[11] Patent Number: 4,583,888
[45] Date of Patent: Apr. 22, 1986

[54] CEMENTED CARBIDE DRILL BIT

[75] Inventors: Yoshikatsu Mori; Yoshio Dohi; Hideo Fukagawa, all of Itami, Japan

[73] Assignee: Sumitomo Electric Industries, Ltd., Osaka, Japan

[21] Appl. No.: 605,879

[22] Filed: May 1, 1984

[30] Foreign Application Priority Data

May 25, 1983 [JP] Japan .................. 58-93098

[51] Int. Cl.[4] .................. B23B 27/10; B23B 51/06
[52] U.S. Cl. .................. 408/59; 408/144; 408/230
[58] Field of Search .................. 408/59, 60, 144, 199, 408/230, 715

[56] References Cited

U.S. PATENT DOCUMENTS

| | | | |
|---|---|---|---|
| 2,778,252 | 1/1957 | Oxford, Jr. ............... | 408/230 |
| 2,903,922 | 9/1959 | Ernst et al. ............... | 408/715 X |
| 2,936,658 | 5/1960 | Riley ........................ | 408/230 |
| 2,966,081 | 12/1960 | Kallio ...................... | 408/230 |
| 3,779,664 | 12/1973 | Caley et al. ............... | 408/230 X |
| 3,945,807 | 3/1976 | Fukutome ................. | 408/144 X |
| 4,116,580 | 9/1978 | Hall et al. ................ | 408/230 |
| 4,340,327 | 7/1982 | Martins ................... | 408/59 |
| 4,461,799 | 7/1984 | Gavrilov et al. ........... | 408/144 X |

FOREIGN PATENT DOCUMENTS

| | | | |
|---|---|---|---|
| 85240 | 8/1983 | European Pat. Off. ........... | 408/144 |
| 2945635 | 5/1981 | Fed. Rep. of Germany ........ | 408/59 |
| 47907 | 7/1979 | U.S.S.R. ........................ | 48/230 |

*Primary Examiner*—Fred Silverberg
*Attorney, Agent, or Firm*—W. G. Fasse; D. H. Kane, Jr.

[57] ABSTRACT

A drill made of cemented carbide, is constructed for compensating for the brittleness of cemented carbide to increase its cross-break strength. For this purpose, the ratio of the diameter c of the web portion (1) to the drill diameter d is set in the range of 25% to 35%, and the flute width ratio (b:a) is set in the range of 0.4:1 to 0.8:1. Further, to decrease the cutting resistance on the drill, the radial rake $\theta_r$ angle of the cutting lip 4 measured at positions spaced at least $\frac{2}{3}$ of the drill diameter toward the outer peripheral side is set in the range of $-5°$ to positive valves. Furthermore, to promote the chip ejecting function, the relative distance L between the cutting lip 4 and the flute wall 5 opposed thereto, is decreased.

18 Claims, 30 Drawing Figures

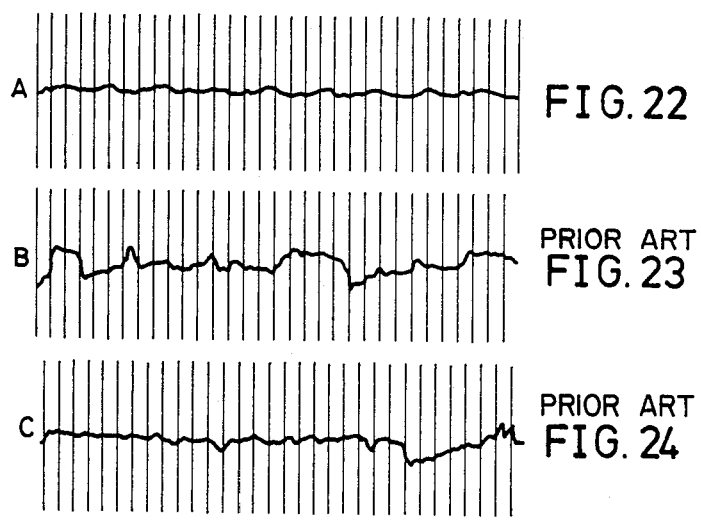

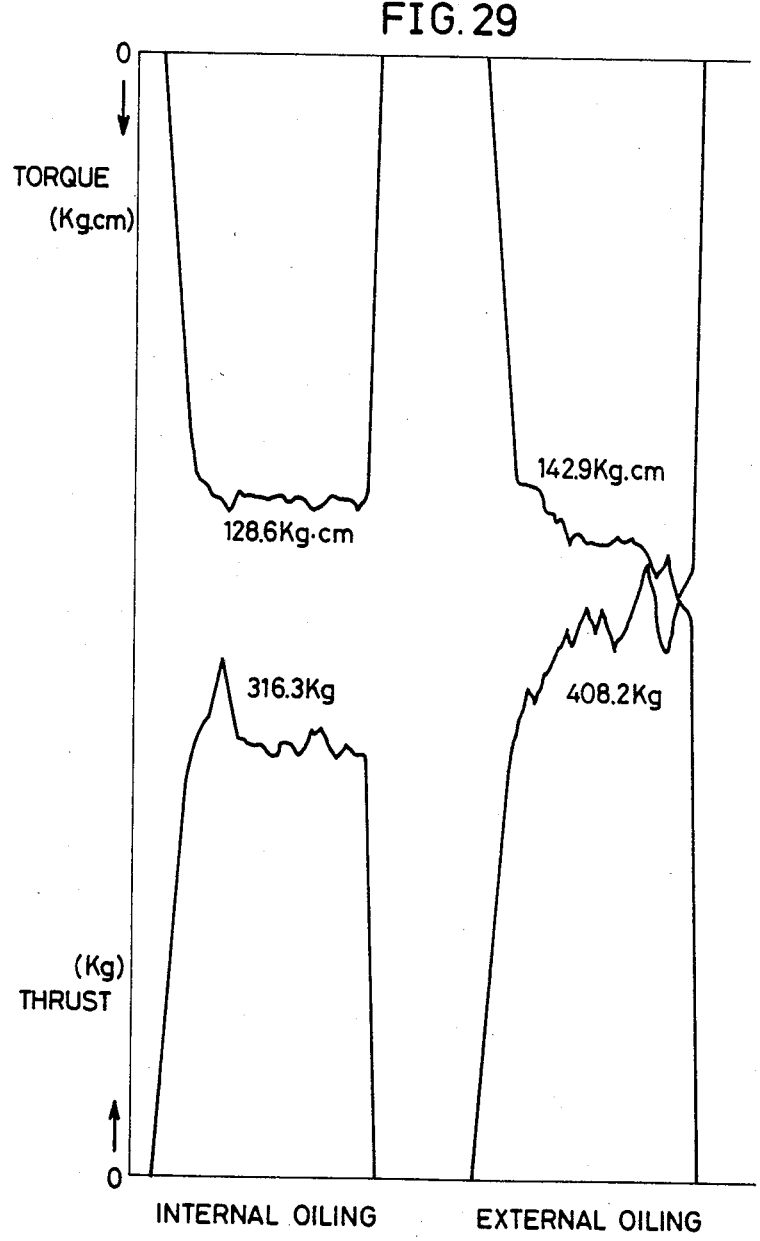

CEMENTED CARBIDE DRILL BIT

BACKGROUND OF THE INVENTION

1. Technical Field of the Invention

This invention relates to a drill bit made of cemented carbide and more particularly to a drill having a construction which compensates for the brittleness of cemented carbide to increase the cross-break strength while decreasing the cutting resistance and simultaneously improving chip ejecting function or ability of the drill bit.

2. Description of the Prior Art

Generally, drills or drill bits of high speed steel have heretofore been used in drilling steel and cast iron work pieces. However, today when there is much need to maximize the efficiency of drilling operations, there are many cases where the drill rpm (cutting speed) is increased to meet this need. Under such circumstances, increasing use is being made, as a drill material, of cemented carbide, which is superior in wear resistance. However, cemented carbide has an inferior in cross-break strength compared to high speed steel and hence it is not a satisfactory material so far as the strength required for withstanding the cutting resistance is concerned. For this reason, with the same construction as in conventional high speed steel drills it is impossible to fully develop the performance of cemented carbide drills and they can be used only under moderate cutting conditions.

In drilling operations, the quality of the chip ejecting function or ability influences the cutting resistance. The greater the drilling depth, the greater the cutting resistance, thus making it necessary to improve the chip ejecting ability so as to prevent an increase in the cutting resistance. This is a matter of great importance particularly to cemented carbide drills.

The strength of drills is given by the toughness and rigidity of the material of which the bit is made and by its bending strength and rigidity and twisting rigidity which depend on the drill configuration.

FIG. 1 shows a conventional drill, looking axially at its cutting end, and the configurational elements will now be described with reference to FIG. 1. The portion indicated by a dashed line is a web portion 1, which is a solid portion where flutes 2 are not formed. That is, as is known in the art, the drill is spirally formed around the web portion 1 with flutes 2 serving as chip ejecting passages and land portions 3 which are thick-walled portions. The ratio c:d of the diameter (c d) of the web portion 1 to the drill diameter (shown by is referred to as the web thickness ratio c:d expressed in %, influences the drill strength and so does the ratio b:a of the circumferential length b of the flutes 2 to the circumferential length a of the land portions 3, referred to as the flute width ratio expressed by b:a. These two ratios are factors which influence the drill strength. FIG. 2 is a graph showing the twisting rigidity or strength as a function of the web thickness ratio with two different flute width ratios as parameters.

However, simply increasing the web thickness ratio and decreasing the flute width ratio increases the cutting resistance and makes the chip ejection difficult. Thus, the web thickness ratio and flute width ratio have their respective limits; generally, the web thickness ratio is set in the range 15% to 23% and the flute width ratio is in the range of 1:1 to 1.3:1.

The strength required of drills should be high enough to withstand the cutting resistance acting on the drill and hence the same effect of increasing the strength can be attained by decreasing the cutting resistance.

Referring to FIG. 1 showing the end view illustrating a conventional drill bit configuration, it is seen that the radial rake angle $\theta_r$ of the cutting lips 4 shows negative values at any position. Generally, the greater the rake angle, the lower the cutting resistance, which means that with conventional drills it is impossible to further decrease the cutting resistance.

Further, the fact that the radial rake angle $\theta_r$ of the cutting lips 4 is negative means that the cutting lips 4 extend increasingly backward with respect to the direction of rotation of the drill as they extend radially outward. Therefore, the relative distance between each cutting lip 4 and the flute wall 5 of the land portion 3 opposed thereto across the flute 2 increases. Where the relative distance is increased, as shown in FIG. 3, a chip 6 being cut by the cutting lip 4 sometimes fails to come in complete contact with the flute wall 5 and instead it extends to as far as the hole wall, which is the finished surface, thus increasing the cutting resistance or damaging the hole wall. Particularly in the case of deep hole drilling, the chip 6 itself chokes up the flute 2, making the chip ejection more difficult and greatly increasing the cutting resistance.

One of the important elements that govern such movement of the chip 6 is the relation between the shape or curve of the cutting lips 4 and the shape or curve of the flute walls 5. Thus, for smooth ejection of the chip 6 along the flute 2, there is an appropriate configurational relationship between the cutting lip 4 and the flute wall 5. One method of expressing the configurational relationship by some index is to represent the positional relation of the flute wall 5 relative to the cutting lip 4 or of the cutting lip 4 relative to the flute wall 5 by the relative distance therebetween. In this invention, this relative distance is defined to provide a measure for the quality of the chip ejection.

Further, in drills, the cutting lips 4 and the edges 7 of the land portions 3 are given a sharp form, and where a drill is made of cemented carbide which is relatively brittle, damage or breakage takes place most frequently in such portion, a fact which is attributable to a kind of configurational element.

SUMMARY OF THE INVENTION

With the aforesaid points in mind, a principal object of this invention is to provide a drill bit wherein the restrictions imposed on cutting conditions by the brittleness of cemented carbide, are alleviated and the hardness, wear resistance and heat resistance of cemented carbide is used to the fullest extent, thus making the drill fit for practical use. More particularly, an object of this invention is to provide a drill bit wherein the bending strength and rigidity and the twisting rigidity are increased to increase the cross-break strength while minimizing the cutting resistance and improving the chip ejecting function or ability.

To achieve this object, this invention sets the diameter c of the web portion 1 in the range of 25% to 35% of the drill diameter d and the flute width ratio in the range of 0.4:1 to 0.8:1. Further, the radial rake angle of the cutting lips as measured at points spaced at least ⅔ of the drill diameter apart toward the outer periphery is set in the range of −5° to positive. Further, the relative distance between the cutting lip and the flute wall opposed thereto is reduced.

Therefore, an advantage of this invention is that the bending strength and rigidity and twisting rigidity of the drill bit are high and the cross-break strength is also high.

Another advantage of the invention is that despite the large web thickness ratio and small flute width ratio, the cutting resistance is low and hence the load on the drill bit is low.

A further advantage of the invention is that despite the large web thickness ratio and the small flute width ratio, the chip ejecting function is high.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 22, 23, and 24 are graphs showing the accuracy of the finished surfaces of the respective drill bits A, B, and C of FIGS. 16, 17, and 18 respectively;

FIG. 29 is a graph showing a comparison between the torque and thrust in the case of internal oiling and external oiling; and FIG. 10 is a graph comparing, the relation between the number of drilled holes and the maximum wear width of the relief surface in the case of internal oiling and external oiling.

DESCRIPTION OF THE PREFERRED EMBODIMENTS AND OF THE BEST MODE OF THE INVENTION

The present drill bit itself is made of known cemented carbide and is naturally superior to conventional high speed steel drills in hardness, wear resistance, and heat resistance.

The principal object of this invention is to specify the configuration of a drill made of cemented carbide which is highly brittle to thereby compensate for its deficiency in strength.

This configuration will now be described in detail. First referring to FIG. 5, the ratio of the diameter c of the web portion 1, shown by a broken line to the drill diameter d, that is, the web thickness ratio is set in the range of 25% to 35%. The flute width ratio, which is the ratio of the circumferential length b of each flute 2 in the hollow portion to the circumferential length a of each land portion 3, b:a, is set in the range of 0.4:1 to 0.8:1. That is, as compared to conventional drills, the present drill bit has an increased web thickness ratio and a decreased flute width ratio.

The radial rake angle $\theta_r$ of each cutting lip 4 as measured at points spaced at least ⅔ of the drill diameter d toward the outer periphery is set in the range of $-5°$ to positive, with the cutting lip forming a concaved arc.

Figure 5:
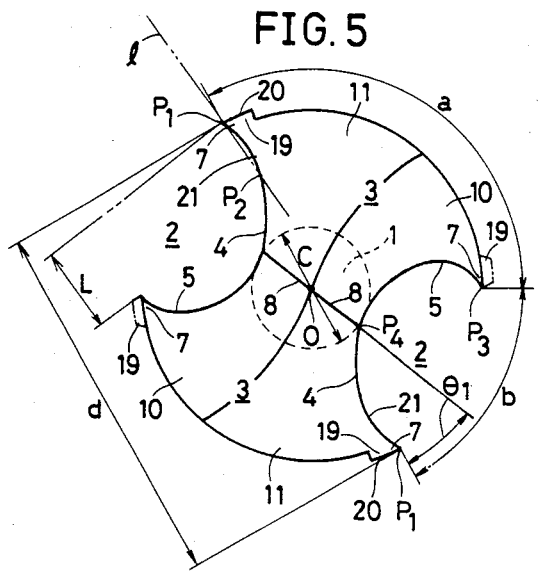
FIG. 5 is an end view showing the cutting end of the drill bit shown in FIG. 4.

Referring to FIG. 5, the distance L defined as the relative distance between a line extending perpendicularly to a reference line 1 connecting the outer peripheral point $P_1$ of the lip 4 and a relatively inwardly located point $P_2$ on the cutting lip 4, and, to the respective outer peripheral point $P_3$ of the flute wall 5 opposed to the cutting lip portion 4 is set at not more than 47% of the drill diameter d.

Since the web thickness ratio is large, the relief surface 11 of each cutting lip 4 corresponding to about one half of the rear portion as seen in the direction of rotation of the drill, is ground off, whereby the cutting lip portion 8 of the web portion is formed. The thinning grinding is done in axial symmetry with respect to the axial center O of the drill, whereby the rake surface 9 of each cutting lip portion 8 and the adjacent ground surface 10 adjoining thereto are formed. This type of grinding is called "the cross thinning", and the cutting lip portions 8 are formed as straight lines 180° apart from the axial center O, as shown in FIG. 5. The chisel width not having a cutting lip portion 8 is set in the range of 0 mm to 0.4 mm irrespective of the drill diameter; preferably, it is as close to 0 mm as possible. Further, the angle $\theta_1$ formed between the direction of the line connecting the outer peripheral point $P_1$ of the cutting lip portion 4 and the direction in which the cutting lip portion 8 of the web portion extends, is set in the range of 35° to 45°.

The rake surface 9 formed by thinning has its axial rake angle $\theta_2$ (shown in FIG. 6) set in the range of $-5°$ to $+5°$. The axial length of the rake surface 9, as shown in FIG. 7, is 0 mm in the portion at the axial center O and gradually increases as it extends radially outwardly. The angle $\theta_3$ formed between a valley line 12 formed by the rake surface 9 crossing the adjacent ground surface 10, and the axial center O of the drill is set in the range of 25° to 60°.

To decrease the notch effect, the portion of the valley line 12 is formed as a rounded surface having a radius of curvature of 0.3 mm to 1.0 mm to allow a continuous smooth transition from the rake surface 9 to the adjacent ground surface 10. This radius of curvature is set irrespective of the drill diameter.

Further, the angle $\theta_4$ (shown in FIG. 6) formed between the rake surface 9 and the adjacent ground surface 10 is set in the range of 90° to 110°.

Figure 4:
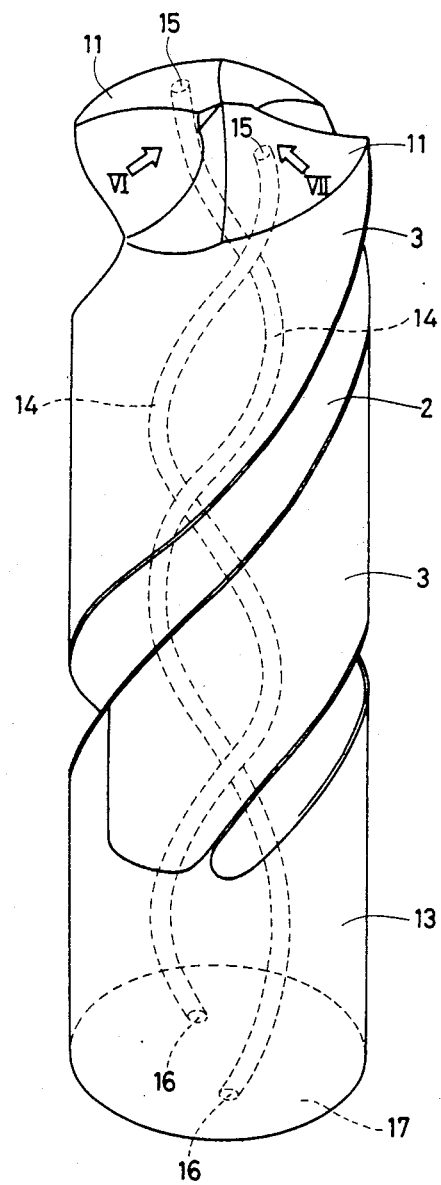
FIG. 4 is a perspective view showing a preferred embodiment of a drill bit according to the present invention.

As shown in FIG. 4, the land portions 3 and shank 13, which are the solid portion extending from the front to rear ends of the drill, are internally formed with two oiling holes 15 for two helical cutting oil channels 14 extending along the twist angle of the flutes 2. The discharge ports 15 of the oiling channels 14 open in the relief surfaces 11 of the cutting lips 4 and the suction ports 16 are open in the bottom surface 17 at the read end of the drill bit. The number of oiling channels 14 is desirably two but it may be one. Further, the inner diameter of the oiling channels 14 is desirably from some percent to 20% of the drill diameter having regard to the required drill strength.

The oiling channels 14 of the drill may be formed by axially forming two holes serving as the oiling channels 14 in a cemented carbide material sintered in the form of a strip, and twisting said strip at high temperature to plastically deform the same.

The cutting lip portions 4 and 8 or the intersections between the inner peripheral surfaces of the flutes 2 and the outer peripheral surfaces of the land portions 3 are portions of sharp form, and these portions are chamfered to prevent breakage.

Figure 8:
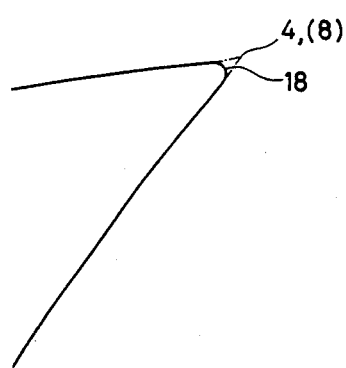
FIGS. 8 and 9 are side sectional views of the principal bit portion, each showing the chamfered portion of a cutting lip in a preferred embodiment of the invention.
Figure 9:
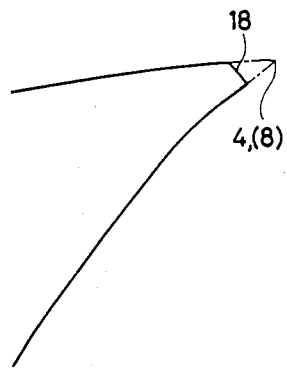

FIGS. 8 and 9 are enlarged sectional views of the edges of the cutting lip portions 4 and 8, and in the case of FIG. 8 the chamfered portion 18 is rounded with a radius of curvature in the range of 0.03 mm to 0.2 mm. In the case of FIG. 9, the chamfered portion 18 has a width in the range of 0.05 mm to 0.2 mm and an angle of inclination in the range of 0° to 30° with respect to the respective rake surfaces. These values are independent of the drill diameter.

Figure 10:
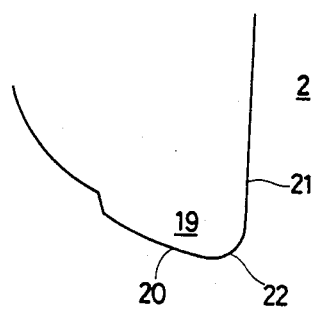
FIGS. 10 and 11 are side sectional views of the principal portion, each showing a chamfered portion at the intersection between the outer periphery of a margin and the inner peripheral surface of a flute in a preferred embodiment of a drill bit according to the present invention.
Figure 11:
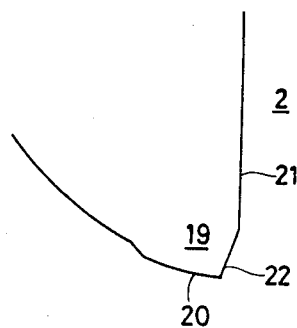

FIGS. 10 and 11 are enlarged sectional views of a portion along the intersection line between the outer peripheral surface 20 of the margin 19 and the inner peripheral surface 21 of the flute 2. In the case of FIG. 10, the chamfered portion 22 has a radius of curvature in the range of 0.3% to 1.5% of the drill diameter, for example, in the range of 0.03 mm to 0.15 mm in the case of a drill diameter of 10 mm. A flat chambered portion 20 is formed which has a width in the range of 2% to 5% of the drill diameter, for example, in the range of 0.2 mm to 1 mm in the case of a drill diameter of 10 mm to 20 mm, and which intersects the outer peripheral surface 20 of the margin 19 at an obtuse angle.

Figure 12:
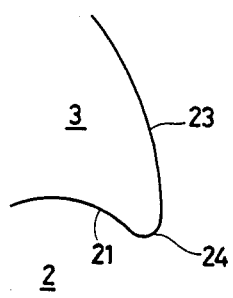
FIGS. 12 and 13 are side sectional views of the principal bit portion, each showing a chamfered portion at the intersection between an outer peripheral relief surface and the inner peripheral surface of a flute in a preferred embodiment of a drill bit according to the present invention.
Figure 13:
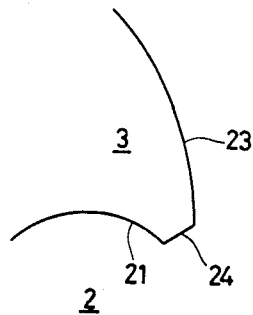

FIGS. 12 and 13 are enlarged sectional views of a portion along the intersection between the outer peripheral relief surface 23 of the land 3 and the inner peripheral surface 21 of the flute 2. In the case of FIG. 12, an arcuate chamfered portion 24 is formed which has a radius of curvature in the range of 0.05 mm to 0.5 mm irrespective of the drill diameter. In the case of FIG. 13, a flat chamfered portion 24 is formed which intersects the outer peripheral relief surface 23 and the inner peripheral surface 21 of the flute 2 respectively at an obtuse angle.

Further, as shown by dash-dotted lines in FIG. 5, each of the widthwise opposite ends of the land portion 3 may have a margin 19.

The surface of the drill having a configuration as defined above is formed with a cover layer made of one or more elements selected from the group consisting of TiC, TiCN, TiN, and $Al_2O_3$, said cover layer being in the form of a thin layer densely formed by an ion plating method or by a chemical vapor deposition method.

Experimental examples in which an embodiment of the invention and a conventional drill bit are compared will now be described.

These experiments to be described below are intended to make a comparison of effects based on cutting lip and flute configurations in drills; thus, to equalize the cutting oil feed conditions in the embodiment of the invention and in the conventional form, the oiling is not of the internal oiling type using oiling channels 14 but of the external oiling type as is conventional. Further, to equalize the effects obtained by thinning, each sample has applied thereto the thinning according to the present invention.

First, the embodiment of the invention and the conventional form are compared as to twisting rigidity.

A comparison between conventional samples $B_1$, $B_2$, $B_3$ and $B_4$ and the present drill bit samples $A_1$, $A_2$, $A_3$, and $A_4$ is shown in Table 1 with regard to the web thickness ratio and the flute width ratio.

TABLE 1

| Web Thickness percentage (%) | Flute width ratio | Sample | Graph mode |
|---|---|---|---|
| Conventional Drill Bit | | | |
| 23 | 1:1 | $B_1$ | |
| 23 | 1.3:1 | $B_2$ | ▨ |
| 15 | 1:1 | $B_3$ | |
| 15 | 1.3:1 | $B_4$ | |
| Inventive article | | | |
| 35 | 0.4:1 | $A_1$ | |
| 25 | 0.4:1 | $A_2$ | ☐ |
| 35 | 0.8:1 | $A_3$ | |
| 25 | 0.8:1 | $A_4$ | |

Figure 14:
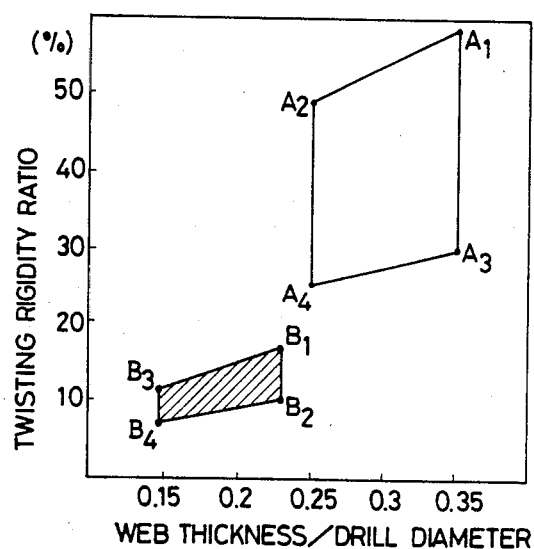
FIG. 14 is a graph showing a comparison between a conventional drill bit and a drill bit according to an embodiment of the invention as to the relationship between the web thickness ratio c:d and the twisting rigidity ratio.

FIG. 14 is a graph showing the results of experiments testing the twisting rigidity in comparison with the data of Table 1, the horizontal axis representing the web thickness ratio and the vertical axis representing the twisting rigidity. It is seen that the decidedly superior to the conventional drill bits $B_1$ to $B_4$ in twisting rigidity, that is, the present drill bits have a higher strength. In addition, the twisting rigidity of a round bar member of circular cross-section having no flute is taken to be 100% and the twisting ratio is expressed as a percentage thereof in comparison with this value.

Figure 15:
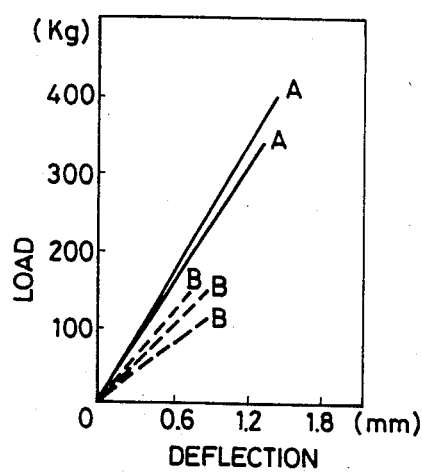
FIG. 15 is a graph showing a comparison between a conventional drill bit and a drill bit according to an embodiment of the invention as to the relation between deflection and load with respect to bending rigidity.

FIG. 15 shows the results of experiments testing the bending rigidity. The sample drill A of this invention had a web diameter of 2.4 mm, the flute width ratio was 0.5:1, and the drill diameter was 8.5 mm. The conventional form sample B was 1.5 mm in the diameter of a flute width ratio of 1.1:1, and a drill diameter of 8.5 mm. As for the experimental method, the sample was fixed at one end thereof in a 25 mm overhanging state, with a load placed on its free end. The horizontal axis indicates deflection in mm and the vertical axis indicates load in kilograms in FIG. 15. It is seen that sample drills $A_1$, A of this invention are superior in strength to the conventional sample drills B.

Next, samples were compared as to their strength with respect to actual drilling tests. The samples used are as shown in Table 2.

TABLE 2

| Drill | Web thickness (mm) | Flute width ratio | Rake angle (°) | Relative distance |
|---|---|---|---|---|
| Inventive drill bit A | 2.4 | 0.42:1 | +10° | 0.16 × d |
| Conventional drill bit B | 2.4 | 0.42:1 | −12° | 0.29 × d |
| Conventional drill bit C | 1.5 | 0.9:1 | −7° | 0.5 × d |

In addition, in Table 2, the relative distance L is expressed as a proportion of the drill diameter.

The first conventional sample B was used as a model sample of typical form for comparison purposes though it is not in common use. Each drill was 8.5 mm in diameter and made of cemented carbide P30 (in Japanese Industrial Standard) coated with TiCN.

Figure 16:
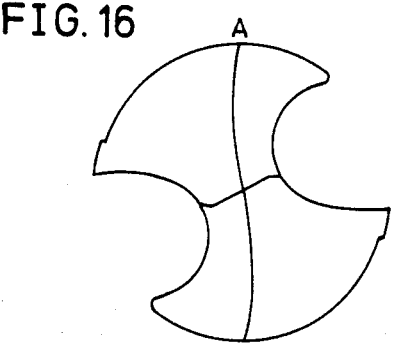
FIG. 16 shows an end view of the cutting end of a drill bit A according to the invention.
Figure 17:
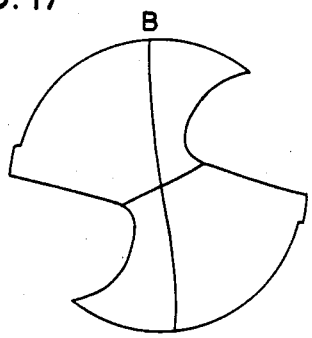
FIGS. 17 and 18 show views similar to FIG. 16, of two different conventional drill bits B, C for comparing with the drill bit A of FIG. 16.
Figure 18:
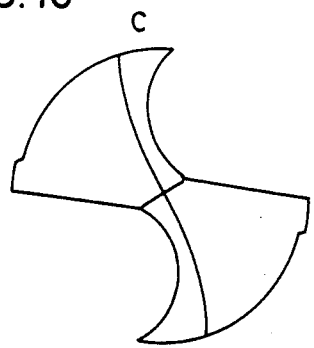

The cutting end configuration of each sample is schematically shown; that of the present drill bit A is shown in FIG. 16, that of the first conventional drill bit B is shown in FIG. 17, and that of the second conventional drill bit C is shown in FIG. 18. As for the cutting conditions, the cutting speed V was 50 mm/min, the feed per revolution, f, was 0.5 mm/rev, drilling-through was 25 mm, the material of the work piece was SCM440, $H_B$ 300, and water-soluble cutting oil was used. The results are shown in Table 3.

TABLE 3

| | Number of holes attained until break | |
|---|---|---|
| Drill Bit | First time | Second time |
| A | 120 holes, continuously | 115 holes |
| B | 93 holes | 15 holes |
| C | 2 holes | 11 holes |

As for the first conventional drill bit B, the strength was high and data equivalent to those of the present drill bits could sometimes be obtained, but the chip discharge of the conventional bit was difficult and the cutting resistance was very high and the conventional drill bit broke.

The second conventional drill bit C was good from the standpoint of treatment of chips and cutting resistance, but the strength was low.

Thus, so far as the data on the drill test are concerned, it is seen that the sample drill bit A of the embodiment of this invention is better than the conventional drill bits B and C.

Figure 19:
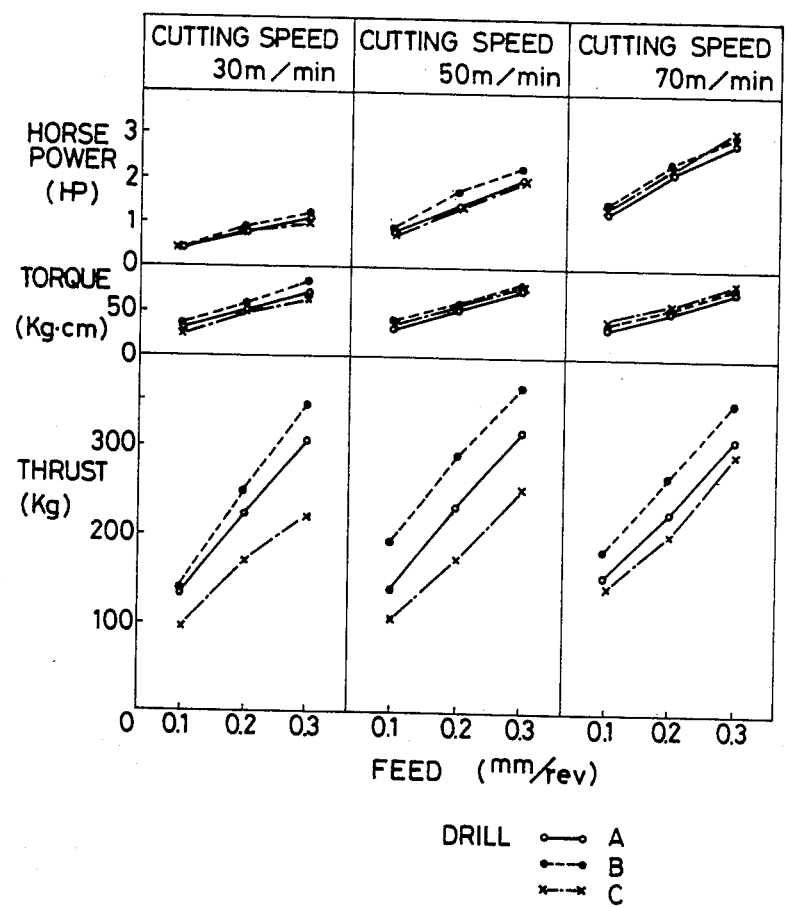
FIG. 19 is a graph showing a comparison of the drill bit A of FIG. 16 with the conventional drill bits B and C of FIGS. 17 and 18, respectively.

The result of the test for cutting resistance conducted by using the same samples as those mentioned above, is shown in FIG. 19. Table 4 is made on the basis of this graph; each value for the second conventional drill bit C is taken to be 1 and the values for the other samples are expressed in terms of proportion.

TABLE 4

| Sample | Thrust | Torque | Horse power |
|---|---|---|---|
| A | 1.25 | 0.98 | 0.97 |
| B | 1.46 | 1.07 | 1.06 |
| C | 1 | 1 | 1 |

As for the conditions, the material of the work piece was S48C, $H_B$ 230.

As can be seen from this result, when the drill bits B and C of conventional form are increased in cross-sectional area, in flute width ratio and in web thickness ratio to increase the strength alone, the thrust and torque increase and also the horse power increases, a fact which is undesirable, whereas in the present drill bit A, although an increase in web thickness ratio results in a slight increase in thrust, the torque and horse power decrease and the cutting resistance is reduced. That is, although the thrust increases by about 25% as a result of an increase in web thickness ratio, the torque and horse power considerably decrease because the radial rake angle is about +10°. In the conventional sample B, because the radial rake angle is −12°, the torque and horse power are, of course, great and the thrust is also naturally great; thus, it is not a good drill bit.

Figure 20:
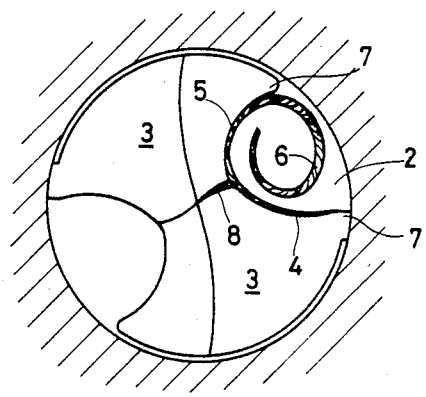
FIG. 20 is a schematic view showing the chip formation by a drill bit according to the invention.

As for the cut finished surface roughness, according to the present drill bit A since it is designed so that the radial rake angle is positive, its sharpness is good, and since the relative distance L between the cutting lip portion 4 and the flute wall 5 opposed thereto is short, chips do not come in contact with the wall of the drilled hole and instead they curl inside the flutes 2 and, as shown in FIG. 20, are discharged in the flutes 2 as they are broken.

Figure 1:
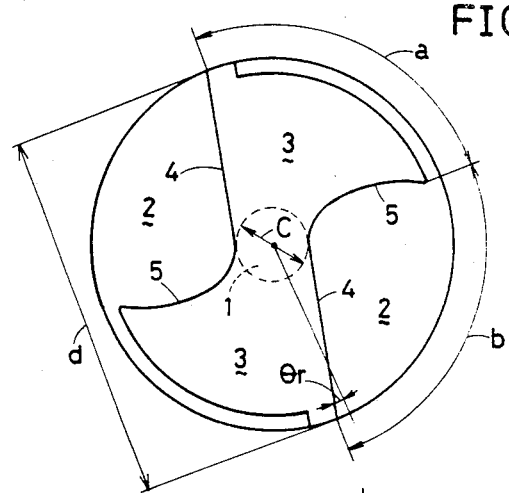
FIG. 1 is an axial view of a conventional drill bit looking at the cutting end thereof.
Figure 2:
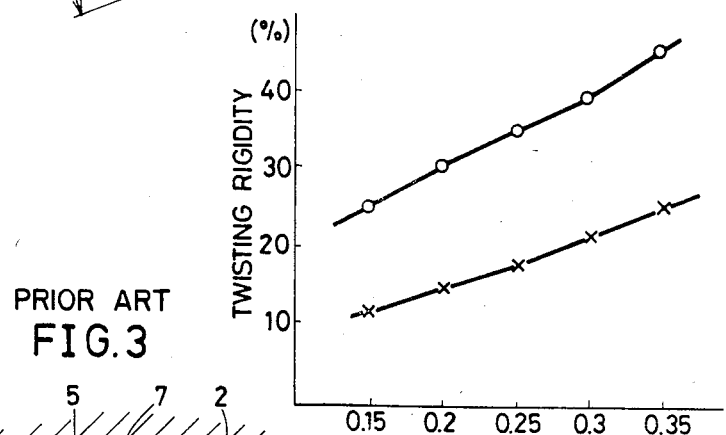
FIG. 2 is a graph showing the twisting rigidity as a function of the web thickness ratio with two different flute width ratios as parameter.
Figure 3:
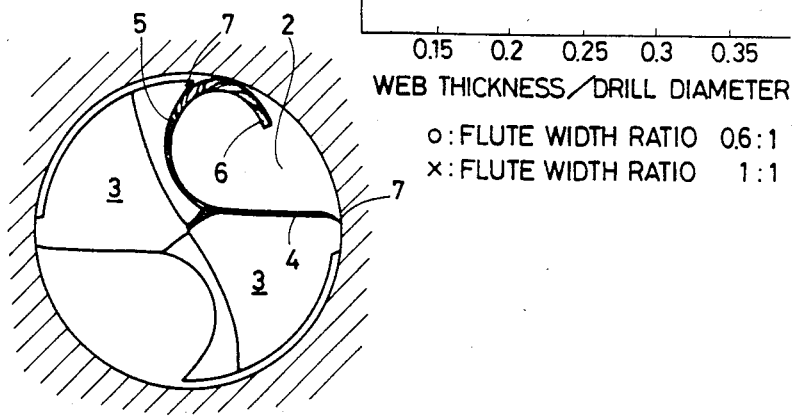
FIG. 3 is a schematic view showing the relationship between the relative distance and the chip forming ability or condition in a conventional drill bit.
Figure 21:
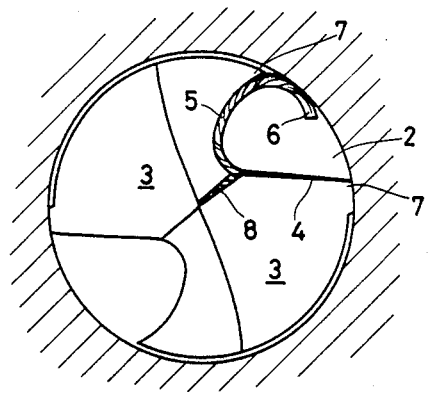
FIG. 21 is a schematic view showing the chip formation conventional drill bit.

In contrast thereto, in the conventional sample drill bits B and C, since the relative distance L to the flute wall 5 is great and since the sharpness is not good, chips strike the wall of the drilled hole and thereby break and hence the cut finished surface is rough, as shown in FIG. 21 or in FIG. 3 by reference to which the prior art was described.

The data regarding the finished surface roughness are shown in FIGS. 22, 23, and 24. In each of these figures, the horizontal axis represents the circumference of the drilled hole and the vertical axis shows the roughness size, whereby the circumference and the roughness size are magnified by 10 times and 250 times, respectively. As can be seen from these figures, the finished surface roughness provided by the sample drill bit of this invention is such that the finished surface is highly accurate.

Figure 25:
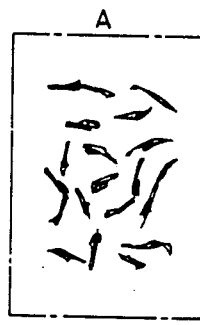
FIGS. 25, 26, and 27 are sampling diagrams showing chips produced by the respective drill bits A, B, C.
Figure 26:
Figure 27:
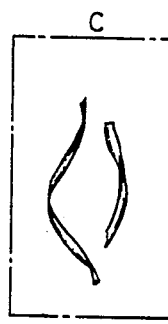

As for chips, since the relative distance L is short and since the sharpness is good, chips curl inside the flutes 2 and break into pieces which then curl with a small radius. FIGS. 25, 26, and 27 show the configuration of chips ejected by the sample drill bits A, B, and C, respectively. As is clear from these figures, that in the sample drill bit A of the present invention, chips break into pieces which are then bent and curled and which, in the flutes 2, are shaped into an easily dischargeable form. Thus, as indicated by the test data, the finished surface is good without being roughened.

As for the allowance for enlargement of drilled holes, it is clear that the less the allowance and the less variation there is in the allowance, the higher the drilling accuracy, the test data being as shown in Table 5.

TABLE 5

| Drill Bit | Allowance for enlargement Unit, μm | |
|---|---|---|
| | Average | Variation |
| A | 4.9 | 3.5 |
| B | 17.7 | 4.3 |
| C | 42.3 | 14.8 |

In the drill bit A of the invention the radial rake angle is positive and the twisting strength, the rigidity and bending rigidity are high. Thus, the allowance for enlargement of drilled holes is clearly much less than in the conventional drill bits, and it is also seen that the variation of the allowance is less according to the invention thus showing the superiority of the drill bits of this invention.

The amount of burr which forms when the drill bit thrusts through a work piece indicates the effect of sharpness, the test result being as shown in Table 6.

TABLE 6

| Drill Bit | Amount of burr Unit, mm | |
|---|---|---|
| | Average | Variation |
| A | 0.39 | 0.06 |
| B | 0.58 | 0.10 |
| C | 0.31 | 0.09 |

As can be seen from this data, in this invention the sharpness does not differ so much from that in the conventional bit samples, but its variation is much less, thus undoubtedly indicating that it is possible to improve the accuracy of a product where the present drill bit is repeatedly used.

The overall ratings of the conventional sample drill bits of the and of the drill bits of this invention on the basis of the these test date are as shown in Table 7; in this table the mark X means "undesirable," the mark ○ means "desirable," and the mark ◎ means "superior." From these ratings it is seen that the sample drill A of this invention is the best of all, next comes the heretofore actually used sample drill bit C, and the worst is the conventional sample drill bit B produced merely as a model.

TABLE 7

| | A | B | C |
|---|---|---|---|
| Strength | ◎ | | x |
| Cutting resistance | ○ | x | ◎ |
| Finished surface | ◎ | x | ○ |
| Chips | ◎ | x | ◎ |
| Allowance for enlargement | ◎ | | x |
| Burr | ○ | x | ◎ |
| Overall rating | ◎ | x | ○ |

In addition, actually usable samples for use in various tests in this invention were produced for comparison with conventional samples, the particulars of these samples being as shown in Table 8. Apart from usefulness, these samples were capable of actual use.

TABLE 8

| | Web thickness | Flute width ratio | Rake angle | Relative length |
|---|---|---|---|---|
| Conventional Drill Bits | 15% | 1:1 | −8.5° | 0.48 × d |
| | 23% | " | −17°. | 0.48 × d |
| | 15% | 1.3:1 | −8.5° | 0.6 × d |
| | 23% | " | −17° | 0.58 × d |
| Inventive Drill Bits | 25% | 0.8:1 | −5° | 0.47 × d |
| | " | " | 0° | 0.42 × d |

TABLE 8-continued

| Web thickness | Flute width ratio | Rake angle | Relative length |
|---|---|---|---|
| " | " | +10° | 0.31 × d |
| 35% | 0.4:1 | −5° | 0.23 × d |
| " | " | 0° | 0.18 × d |
| " | " | +10° | 0.11× d |

The function of the configuration obtained by thinning, as mentioned above, will now be described.

In FIG. 5, since the chisel width formed with no cutting lip portion 8 in the web portion, is set in the range of 0 mm to 0.4 mm, the cutting resistance in the web portion is greatly decreased. Further, since the angle $\theta_1$, which influences the shape of chips, is set in the range of 35° to 45°, chips are produced in such a manner that those being removed from the portion cut by the cutting lip portion 8 differ in direction from those being removed from the portion cut by the cutting lip portion 4 in the web portion and hence they are produced in such a form that they can be easily curled and broken. If the angle $\theta_1$ is too small, chips would be almost flat and could hardly be curled or broken, while if it is too large, the proportion of the portion cut by the cutting lips 8 to the whole would be small and could hardly be curled.

Figure 6:
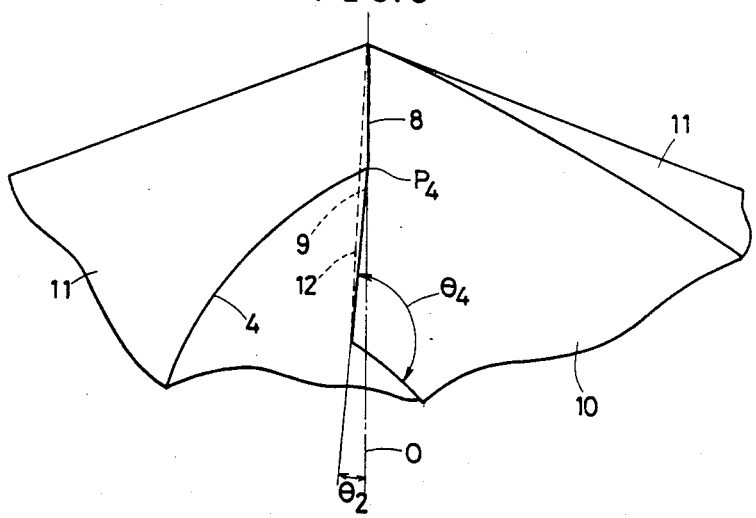
FIG. 6 is a side view of the principal portion taken in the direction of arrow VI of FIG. 4.
Figure 7:
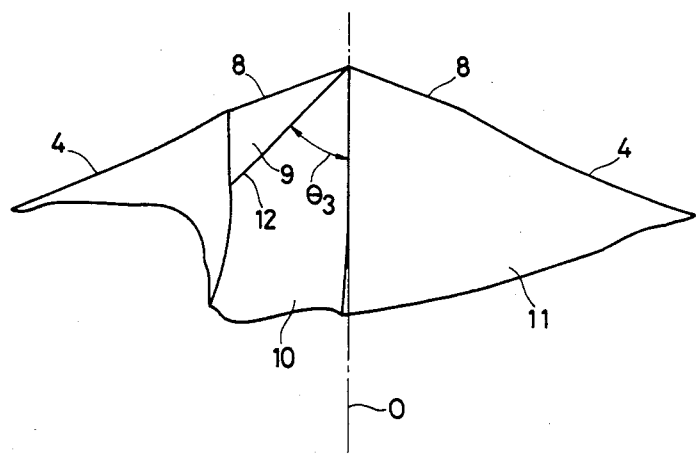
FIG. 7 is a side sectional view taken in the direction of arrow VII of FIG. 4.
Figure 28:
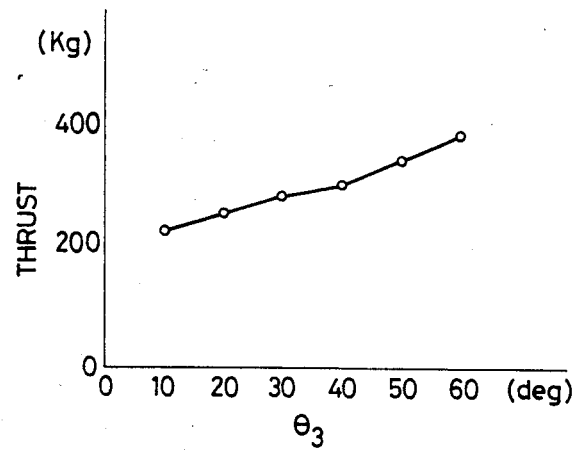
FIG. 28 is a graph showing the thrust as a function of the rake angle $\theta_3$.

In FIGS. 6 and 7, the rake angle $\theta_2$ of the cutting lip portions 8 in the web portion is set at −5° to +5°. The rake surface 9 of each cutting lip 8 has an axial length such that it is 0 mm in the axial central portion and gradually increases radially outwardly. The angle $\theta_3$ of the valley line 12 with respect to the axial center O is set at 25° to 60°. These configurations are determined with angles which provide the rake surface 9 with a sufficient axial length to prevent chips cut by the cutting lip portions 8 from striking the adjacent ground surface 10 to increase the thrust, and they are determined so as to provide a sufficient breaking action on the chips. Further, they are determined so that a sufficient strength may be obtained. FIG. 28 is a graph showing the relation between the size of the angle $\theta_3$ and the size of the thrust acting on the drill bit.

Further, since the portion along the valley line 12 is formed with a rounded curved surface, breakage due to a notch effect can be prevented. If the radius of curvature is too small, the notch effect could not be sufficiently reduced, while if it is too large, the axial length of the rake surface 9 could not be made sufficiently great or the rake angle $\theta_2$ would be negative, detracting from sharpness. Thus, the proper radius of curvature is in the range of 0.3 mm to 1.0 mm. Further, the fact that the angle $\theta_4$ in FIG. 6 is set in the range of 90° to 110° prevents chips from increasing thurst and provides a sufficient breaking action.

That is, cross thinning is applied to the front end of the drill bit to form cutting lips on the web portion, whereby it is possible to minimize the increase of cutting resistance due to increasing the web thickness ratio, and where a highly brittle material such as cemented carbide is used has a material for the drill, it is possible to prevent breakage due to brittleness. Particularly, by providing the portion along the valley line 12 with a rounded curved surface, it is possible to prevent a break due to cracking of the portion along the valley line 12. Further, it is possible to maintain chips in suitable curl form to promote the chip ejecting function.

The action of the oiling holes 14 for cutting oil will now be described.

In drilling operations, it is common practice to feed cutting oil to the cutting lips to cool and lubricate the cutting lips and work piece. The common oiling method is to feed cutting oil to the cutting portion of the drill sunk into the work, from the outside through the drill flutes and through a clearance between the drill bit and the wall of the hole in the work piece being drilled. However, in drilling operations using a drill made of cemented carbide, one object is to increase the rotative speed of the drill, and since the drill flutes are spirally formed to discharge chips from the hole when the drill bit is rotating, the cutting oil fed along the flutes is subjected to a centrifugal force which throws the oil out of the hole. Thus, particularly in deep drilling, it follows that it is impossible for the cutting oil to reach the cutting lips. In deep drilling, chip ejection is not smoothly effected, causing the danger of increasing the cutting resistance to break the drill.

However, in a drilling operation using a drill bit having oiling channels 14 constructed in the manner described above, when cutting oil is forced in from the suction ports 16 of the oiling channels 14 through a drill holder, the cutting oil flows through the oiling channels 14 and out of the discharge ports 15 at the front end and then fed to the cutting lip portions 4, thus effectively cooling the cutting lips. Further, the return oil passes through the flutes 2 and is discharged, whereby it accelerates the discharge of chips and cools the work piece. Therefore, the cutting resistance (torque and thrust) is stabilized and hence breakage is prevented.

FIG. 29 is a graph showing how the torque and thrust change when cutting oil is fed externally and internally. Under the present conditions, the drill diameter is 10 mm and a 40 mm thick plate of S50C, $H_B$ 250 is drilled, the cutting conditions being such that the cutting speed V is 50 m/min, the feed advance per revolution f is 0.3 mm/rev. As illustrated, the maximum torque is 142.9 kg/cm for external oiling and 128.6 kg/cm for internal oiling, while the maximum thrust is 408.2 kg for external oiling and 316.3 kg for internal oiling. In each case, the cutting resistance or load is lower where internal oiling is used.

Figure 30:
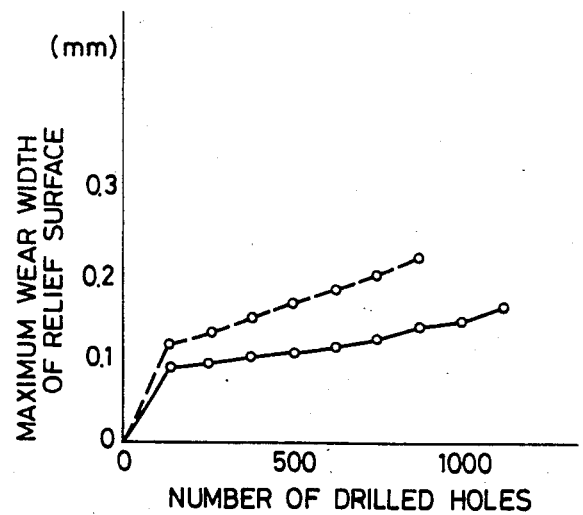

FIG. 30 is a graph showing the amount of wear of the cutting lips. The conditions are the same as the aforesaid conditions. The solid line refers to internal oiling and the broken line to external oiling. As illustrated, it is clear that the amount of wear is less in the case of internal oiling. That is, it is seen that internally fed cutting oil ensures perfect cooling and lubrication of the cutting lips.

In addition, the oiling holes in the shank 13 of the drill may be straight rather than helical as shown.

The chamfered portions of the drill bit were described with reference to FIGS. 8 to 13. The portions to which chamfering is applied, are all the portions having a sharp form, and particularly in the case of a drill bit using cemented carbide which is very brittle, the provision of such chamfered portions is effective in preventing breakage of such portions.

The action of a coating on a drill bit having such a coating layer of TiC, TiCn, TiN, and/or $Al_2O_3$ on its surface, will now be described.

Coating with said materials improves the heat resistance of the drill bit and reduces its wear, and the low coefficients of friction make it possible to reduce the thrust and torque.

When the drill bit is worn out, it is reground to resharpen the cutting lips, and even if this regrinding exposes the mother metal in the relief surfaces 11 of the drill bit, the coating layer remains in the rake surface and the outer peripheral surface of the margins 19, so that the cutting resistance can be maintained at the lower level.

While the embodiments refer to drill bit using cemented carbide or other highly brittle materials, it goes without saying that the same functions and effects can be obtained even if the invention is applied to high speed drills.

EFFECTS OF THE INVENTION

The drill bits of this invention basically have the effect of greatly increasing the twisting rigidity and also the bending rigidity.

Drilling operations can be performed with lower torque and horse power than when using the drill of conventional form, and as compared with a drill of conventional form which has a negative radial rake angle but which is modified by simply increasing the web thickness ratio and decreasing the flute width ratio, the drill of the invention has the superior effect of greatly decreasing the cutting resistance.

Further, the decreased relative distance enables the ejection of chips to be effected exclusively inside the flutes and accelerates the ejection without damaging the wall of the hole in the work, so that the finishing accuracy is improved and the yield of product is increased.

That is, according to this invention, the advantage of cemented carbide superior in wear resistance is fully utilized, and drilling with less cutting resistance than in the prior art is possible, and since the rigidity is improved as a whole, there is much less breakage of drill bits.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a drill bit made of superhard material having a drill bit body with a drill diameter d, lands and flutes separated by said lands in said drill bit body, a shank end and a cutting end in said drill bit body, said lands having a circumferential width a, said flutes having a circumferential width b, said drill bit body having a central web with a web diameter c, a longitudinal central axis extending lengthwise through said central web, and cutting lip means, said drill diameter d defining a drill periphery, the improvement comprising a flute width ratio b to a in a range from 0.4:1 to 0.8:1, a web thickness ratio c:d in a range from 25% to 35% of said drill diameter d, a radial rake angle ($\theta_r$) of said cutting lip means taken at positions spaced at least $\frac{2}{3}$ of said drill diameter toward said drill periphery within the range of $-5°$ to positive angular values, and a distance L from a line perpendicular to a reference line (l) connecting an outermost point ($P_1$) on said periphery of said cutting lip means as seen in an end view of said cutting end and a point ($P_2$) located inwardly relative to said point ($P_1$) on the cutting lip means spaced $\frac{2}{3}$ of a drill radius from said central axis, to an outermost peripheral end point ($P_3$) on a flute wall opposite to said cutting lip means across the respective flute, said distance L corresponding to not more than 47% of said drill diameter d.

2. The drill bit as set forth in claim 1, wherein in said end view of the cutting end, a portion of the cutting lip means spaced at least ⅔ of the drill diameter d toward the outer periphery, is arcuate so that its radial rake angle $\theta_r$ is set within the range of 0° to positive angular values.

3. The drill bit as set forth in claim 1, wherein a portion (22) where an outer peripheral surface (20) of a margin (19) intersects an inner peripheral surface (21) of said flutes, is chamfered.

4. The drill bit as set forth in claim 3, wherein said chamfered portion (22) is an inclined plane obliquely intersecting the outer peripheral surface (20) of said margin (19).

5. The drill bit as set forth in claim 4, wherein said inclined plane has a width which is in the range of 2% to 5% of said drill diameter d.

6. The drill bit as set forth in claim 3, wherein said chamfered portion (22) has a rounded curved surface.

7. The drill bit as set forth in claim 6, wherein the rounded curved surface has a radius of curvature which is in the range of 0.3% to 1.5% of the drill diameter d.

8. The drill bit as set forth in claim 3, wherein the portion where an outer relief surface (23) of a land (3) intersects the inner peripheral surface (21) of the flute (2), is a flat chamfered portion (24) having a radius of curvature in the range of 0.05 mm to 0.5 mm, said chamfered portion (24) intersecting said surfaces (21, 24) at an obtuse angle.

9. The drilll bit as set forth in claim 1, wherein: said web (1) has a configuration formed by thinning so that a chisel width is in the range of 0 mm to 0.4 mm, wherein in said end view of said cutting end, the cutting lip means (8, 8) extending radially outwardly from said central axis O of said web (1) are each straight, and wherein an angle $\theta_1$ is formed between the direction in which the cutting lip means of said web (1) extends and the direction extending from said central axis to an outermost pheripheral end of said cutting lip means extending to the periphery of said drill bit from a radial outermost end ($P_4$) of the cutting lip means of said web (1), where these directions intersect each other, is set in the range of 35° to 45°.

10. The drill bit as set forth in claim 9, wherein said web has a rake surface (9) formed by thinning, said rake surface (9) having an axial rake angle $\theta_2$ in the range of −5° to +5°, said rake surface having an axial length of 0 mm at said central axis of said drill bit body and wherein said rake surface defines a valley line (12) intersecting an adjacent ground surface (10) formed concurrently therewith by thinning, said valley line (12) having an angle $\theta_3$ of inclination in the range of 25° to 60°.

11. The drill bit as set forth in claim 10, wherein the angle formed between the rake surface (9) of said web and said adjacent ground surface (10) is in the range of 90° to 110°, and wherein a portion along said valley line (12), namely a cross-section of a boundary region passing from the rake surface (9) of said web to said adjacent ground surface (10), forms an arc whose radius of curvature is in the range of 0.3 mm to 1.0 mm.

12. The drill bit as set forth in claim 9, wherein all of the cutting lip means including those of said web (1) are each formed with a chamfered portion (18) having a radius of curvature in the range of 0.03 mm to 0.2 mm and a slope having a width in the range of 0.05 mm to 0.2 mm, said slope forming an angle with the rake surface in the range of 0° to 30°.

13. The drill bit as set forth in claim 1, wherein each opposite end of said lands has a margin (19).

14. The drill bit as set forth in claim 1, wherein said drill body has a shank (13) near said shank end, and oiling channels (14) extending inside said lands of the drill bit body and inside said shank (13).

15. The drill bit as set forth in claim 1 wherein said superhard material is cemented carbide.

16. The drill bit as set forth in claim 1, wherein said superhard material is high speed steel.

17. The drill bit as set forth in claim 1, wherein at least a portion of the surface of the main body of the drill bit including at least the cutting lip means (8) is coated with a material selected from the group consisting of TiC, TiCN, TiN, and $Al_2O_3$.

18. The drill bit as set forth in claim 17, wherein part of said surface including at least the cutting lip means includes at least the rake surface and the outer peripheral surface (20) of the margin (19).

* * * * *